Feb. 2, 1960
C. E. ELLSWORTH
2,923,801
DIELECTRIC HEATING SYSTEM
Filed May 9, 1958
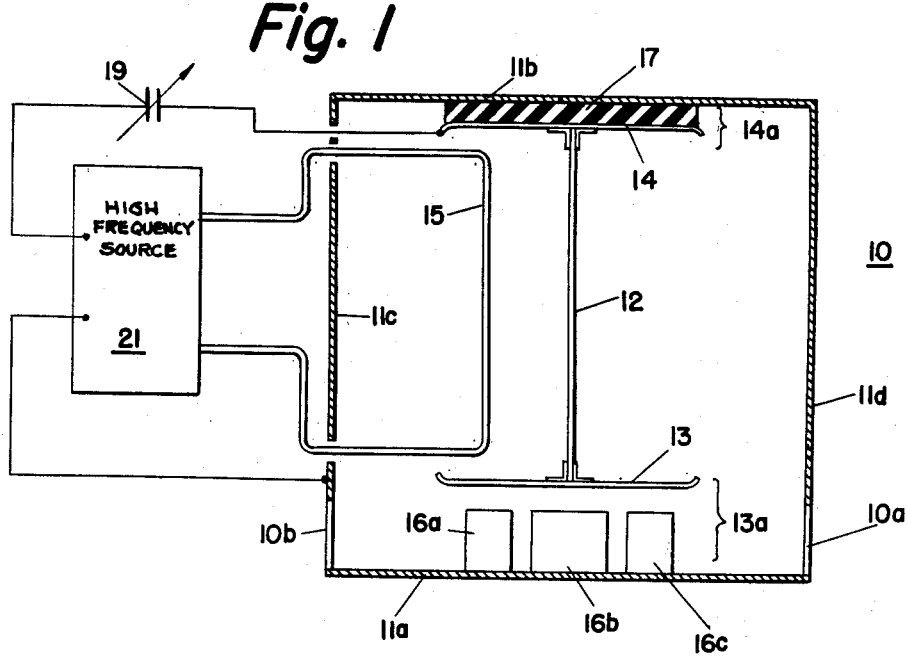
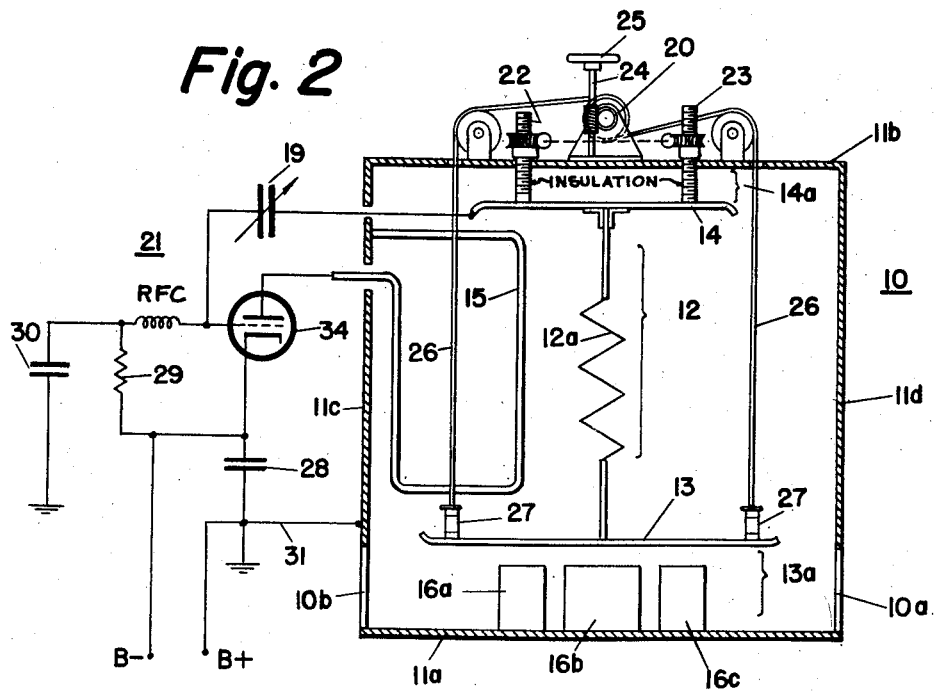

United States Patent Office 2,923,801
Patented Feb. 2, 1960

2,923,801
DIELECTRIC HEATING SYSTEM

Carl E. Ellsworth, Anchorage, Ky., assignor to Chemetron Corporation, Chicago, Ill., a corporation of Delaware Application May 9, 1958, Serial No. 734,262
10 Claims. (Cl. 219—10.55)

This invention relates to high-voltage, high-frequency heating systems of the type particularly adapted to the treatment of dielectric materials, and has for an object the provision within an applicator of an inductance element non-conductively coupled to associated structure but forming with that structure and with heating electrodes a resonant circuit.

The present invention represents improvements upon dielectric heating systems and applicators of the reentrant type disclosed in Warren Patent No. 2,783,344 of February 26, 1957. Applicators of the reentrant type include a housing within which there are disposed heating electrodes for the work and an inductance element in the form of a fin which extends from one of the electrodes toward a wall of the housing. The inductance element has heretofore been conductively connected to wall structure of the housing and to one of the heating electrodes the other of which electrodes has been conductively connected to wall structure of the housing. Though not essential, it has in the past been generally preferred to utilize a tuned circuit formed by the inductance element and by the spaced heating electrodes as the frequency-determining circuit of a self-excited oscillator forming the source of high frequency power. As explained in said Warren patent, the grid excitation of the power oscillator may be derived from the applicator itself, preferably in conjunction with a voltage divider which may be connected to the "hot" one of the heating electrodes or, for a reduced voltage, to a selected point on the inductance fin.

The frequency of the tuned circuit of a reentrant type of applicator depends upon the inductance provided by the fin and upon the capacitance between the heating electrodes. The dimensions of the heating electrodes are selected in terms of the area of the work to be treated. For example, for the treatment or heating of wall board or foam rubber mattresses, the electrodes will necessarily be relatively large in one dimension, and frequently the overall area will be quite substantial. With electrodes four feet by eight feet and with close spacing for wall board, the capacitance will be quite large. The resonant frequency will be correspondingly decreased.

In accordance with the present invention, the inductance element, the fin, of a reentrant type of applicator has at each of its opposite ends a capacitor. These capacitors capacitively and non-conductively complete, through a return circuit such as formed by wall structure of the applicator, a resonant circuit having a capacitance materially less than that due to the capacitance of but one of said capacitors. By making one of said capacitors larger than the other, a grid-driving voltage may be derived from such capacitor, with the voltage derived therefrom reduced in value over what it would be if derived from a single capacitor. Either one or both of the capacitors at the respective opposite ends of the inductance element may be utilized for the heating or treatment of dielectric material.

For further objects and advantages of the invention, and for a more detailed discussion of the invention, reference is to be had to the following description taken in conjunction with the accompanying drawings, in which:

Fig. 1 diagrammatically illustrates an applicator of the reentrant type embodying the present invention; and Fig. 2 diagrammatically illustrates a modification of the invention including one type of oscillator.

Referring to Fig. 1, the invention in one form has been illustrated as applied to an applicator 10 having conductive wall structure forming a housing for a heating chamber within which there is disposed a fin 12 forming an inductance element spaced from all of the wall structure. There is electrically connected to the lower end of the fin or inductance element 12 a plate 13 of a capacitor 13a, the other plate of that capacitor being formed by the bottom wall 11a of the applicator 10. The plate 13 and the bottom wall 11a form heating electrodes for the dielectric heating of work illustrated at 16a—16c. For simplicity, the applicator 10 has been shown with openings 10a—10b through which the work may be moved into and out of the applicator. It is understood that a conveyor may extend through the applicator and itself form the lower electrode, the conveyor being electrically connected to the wall structure.

In accordance with the present invention, the inductance element 12 is non-conductively connected into a resonant heating circuit by means of the capacitor 13a and by means of a second capacitor 14a. The plates 13 and 14 of the respective capacitors are conductively connected to the respective opposite ends of the inductance element 12. The remaining end-plate of each of capacitors 13a and 14a is formed by adjacent wall structure of applicator 10. Accordingly, the resonant heating circuit includes the conductive connection between the walls 11a and 11b, as by way of walls 11c and 11d, with the two capacitors 13a and 14a in series with the fin or inductance element 12 located between them.

High frequency electrical energy is supplied to the resonant heating circuit from a suitable source 21 by way of a coupling loop 15. The magnetic field produced by the loop 15 excites the resonant applicator and as a result, a high frequency current of large magnitude is produced in the resonant heating circuit. The current flows lengthwise of the inductance element 12 between the capacitors 13a and 14a. Due to the current flow by way of element 15, a magnetic field encircles the element 12 and a large part of it threads or cuts the effective area of loop 15. At the same time that a magnetic field is produced in the unobstructed space surrounding the fin or element 12, a high-frequency high-voltage electric field is produced across the capacitors 13a and 14a. Accordingly, work to be heated or treated by such a field may be placed between the plates or electrodes of either one or both of capacitors 13a and 14a.

As shown, work-objects 16a, 16b and 16c are disposed between the "hot" electrode 13 and the "ground" electrode 11a. For reasons later to be explained, dielectric material 17 having a very low loss factor is disposed between "hot" electrode 14 and "ground" electrode 11b. The dielectric material 17 is preferably of length and breadth at least coextensive with electrode 14.

Instead of dielectric material 17, the electrodes or plates 11b and 14 may comprise heating electrodes for work disposed between them, as through a suitable opening or openings which may be provided in the applicator 10.

For a detailed discussion of the operation of applicators of the reentrant type, to which the present invention has been applied, reference is to be had to said Warren Patent No. 2,783,344, and particularly in connection with Figs. 12–38 thereof. Reference is also made to Fig. 8 of said patent as an example of an arrangement in which the applicator itself does not form a part of a self-excited oscillator, but instead is excited from an independent oscillator. Whether an independent oscillator be utilized or whether the applicator forms a part of the frequency-determining circuit, the provision of the capacitors 13a and 14a at the respective ends of the inductance element 12 effectively decreases the capacitance of the resonant circuit, and thus permits operation at higher frequencies. Operation at a high frequency will be preferred in most cases over operation at a lower frequency because the heating effect increases as frequency is increased.

The high-frequency source 21 may be provided with its own frequency-determining circuit. That circuit will be adjusted to match the resonant operating frequency of the tuned circuit formed by the applicator 10. Thus, the higher the resonant frequency of the applicator 10, the higher may be made the resonant frequency of the frequency-determining circuit of the source 21. As shown in Fig. 1, the high-frequency source 21 utilizes the applicator 10 as the frequency-determining circuit. More particularly, there is provided a connection to the capacitor plate 14 by way of a feedback capacitor 19 for application to a grid circuit of source 21 of a grid-driving potential.

As explained in said Warren patent, relatively high voltages are developed within the applicator 10. In order to reduce the voltage derived from the applicator 10 by way of the capacitor 19, the capacitor 14a is provided with a capacitance which is large compared with that of capacitor 13a. The capacitance of capacitor 14a can be made much larger than that of capacitor 13a by providing plate 14 with the same dimensions or area as plate 13 and arranging plate 14 in closer proximity to plate 11b than plate 13 is with respect to plate 11a. Further to increase the capacitance and to minimize the possibility of arc-over due to a close spacing of the plates, a material 17 having a high dielectric constant and a low power factor (a low loss factor) may be interposed between plates 11b and 14. The material 17 may be mica or it may be made of a material available on the market under the tradename "Teflon" and used to indicate an available source of polytetrafluoroethylene.

By deriving the grid excitation voltage from the capacitor 14a, of larger capacitance than capacitor 13a, the capacitor 19 can have a voltage rating adequate to withstand the lower voltage across that capacitor but less than would be required to withstand the higher voltage developed across capacitor 13a of lower capacitance. The use of a capacitor 19 having a lower voltage rating than would be needed if the voltage were derived from capacitor 13a may represent a considerable saving in cost.

Referring now to Fig. 2, the plate or electrode 13 has been shown as adjustable as by rotation of a cable-drum 20. Though this drum may be rotated by a motor, it has been shown as driven by a hand-wheel 25 to pay out, and to take in cable 26, of suitable insulation material or non-magnetizable metal, which, through insulators 27, support the plate 13. The fin or inductance element 12 has been shown as including an accordion-folded flexible portion 12a. As cable is payed out from the drum 20, the electrode 13 is moved toward the lower plate 11a. In some applications of the invention, such as for the heating of wall board, the ultimate spacing between electrodes or plates 11a and 13 will be relatively small. With wall board of large dimensions, as great as 4 feet x 8 feet, it will be understood that the capacitance will be quite high. The higher the capacitance, the lower will be the resonant frequency of the applicator. However, the effective capacitance of the resonant circuit is reduced by the additional series capacitor 14a located at the upper end of the fin 12. This capacitor may include the fixed dielectric material, such as illustrated in Fig. 1, or as shown in Fig. 2, it may be an air capacitor. Additionally, it may be adjustable as by way of the insulated threaded members 22 and 23, each provided with worm wheels driven by worm gears through a suitable mechanical connection, as indicated by the broken line interconnecting the worm gears. Accordingly, the capacitance of capacitor 14a may be adjusted as desired to establish a selected or predetermined capacitance for the resonant circuit of the applicator 10 for any selected spacing between electrodes 11a and 13.

The high-frequency source 21 has been illustrated as of the same type as the oscillator 24b of Fig. 12 of said Warren Patent No. 2,783,344. Instead of deriving the grid-driving voltage from the lower electrode 13 of accompanying Fig. 2, it will be noted that it is derived from the upper electrode or plate 14 and is applied to the frequency-determining circuit of the oscillator 21 by way of the adjustable capacitor 19. By reason of the connection of the frequency-determining circuit to the upper plate 14, the phasing of loop 15 is reversed relative to the phasing of the corresponding loop of said patent. In accompanying Fig. 2, the upper end of the loop 15 is electrically connected to the wall structure 11c, while the opposite end of that loop extends through wall structure 11c as by way of an opening. If desired, suitable solid insulation (not shown) may be used in place of the air insulation, provided by the opening.

The grid terminal on many power tubes is located at the top, with the anode terminal near the bottom. Accordingly, a power tube 34 of the oscillator may be located close to the side wall 11c with a short lead extending from the grid to the capacitor 19. Without need of crossover, a second short lead may extend from the anode terminal to the end of the loop 15 protruding through wall 11c.

Further, in connection with the oscillator 21, it will again be noted that the voltages respectively across capacitors 13a and 14a will have values inversely proportional to their respective capacitances. Thus, an increase in capacitance between the electrodes 11a and 13, as occurs with introduction of material 16a—16c between the electrodes, will cause a relatively higher voltage to appear across the upper capacitor 14a. The resultant increase in voltage at capacitor 14a increases the grid excitation. Thus, the operation is in a direction to compensate for the increased loading of the oscillator 21 as the capacitance of capacitor 13a increases with increased load between electrodes 11a and 13.

The foregoing results are achieved in addition to the provision in the oscillator 21 of a voltage divider and compensating circuit fully described in said Warren patent and comprising capacitor 19 and the interelectrode capacitance between the grid and cathode of the power tube 34. In other respects, the oscillator 21 is conventional and includes a by-pass capacitor 28, a high-frequency grid choke coil RFC, a gridleak 29, a by-pass capacitor 30, and a source of anode supply labeled B+ and B−.

While preferred modifications and a number of variations thereof have been described, it is to be understood that many additional modifications of the invention may be made within the scope of the appended claims. The present invention provides great flexibility in the operation. Thus the plate 14 may be adjusted concurrently with the plate 13 to maintain relatively constant the capacitance of the resonant heating circuit. The plate 14 may be adjusted independently of plate 13 to compensate for a changing capacitance of capacitor 13a for a changing heating load. With both capacitors 13a and 14a utilized for the heating of work which may pass first through one and then through the other of capacitors 13a and 14a whose plates then form heating electrodes, the relative capacitances may be adjusted for the control of the heating effects.

What is claimed is:

1. In a dielectric heating system, the combination of an applicator having conductive wall structure, high-frequency supply means, an inductance element disposed within said applicator and in spaced relation to all wall structure thereof, a capacitor at each opposite end of said inductance element electrically interconnecting said inductance element with said wall structure to form a resonant circuit therewith, said inductance element and said capacitors respectively providing the inductance and capacitance primarily determining the resonant frequency of said high-frequency supply means, said last-named means including a grid-driving circuit having a connection to said resonant circuit and an output circuit for supplying high-frequency current to the applicator for heating of a load which at least in part forms the dielectric of at least one of said capacitors, said wall structure having at least one access opening for disposition of said work as part of said dielectric of at least one of said capacitors, and means for relatively adjusting the capacitances of said capacitors to produce selected potential differences across said capacitors.

2. The combination set forth in claim 1 in which one of said capacitors has a capacitance which is large relative to that of the other of said capacitors, said grid-driving circuit for said high-frequency supply means being connected across the larger of said capacitors.

3. In a dielectric heating system, the combination of a reentrant applicator having conductive wall structure, an extensible and retractible inductance element disposed within said housing, a pair of serially connected capacitors within said housing at the respective ends of, and in series circuit relation with, said inductance element, the series circuit including said inductance element and said capacitors including at least a part of said wall structure and forming the frequency-determining circuit of said applicator, and means for supplying high-frequency electrical energy to said applicator including an electric valve having a grid-driving circuit connected across one of said capacitors for application thereto of the exciting voltage developed across said one capacitor.

4. The combination set forth in claim 3 in which one of said capacitors has a capacitance which is large compared with that of the other of said capacitors and in which said grid-driving circuit is connected across the larger of said capacitors, and means for adjusting said capacitors independently of each other.

5. In a dielectric heating system, the combination of a reentrant applicator having conductive wall structure, a high-frequency supply means, a retractible and extensible inductance element disposed within said applicator and in spaced relation to all wall structure thereof, a capacitor plate at each opposite end of said inductance element capacitively connecting said inductance element with adjacent wall structure to form a resonant load circuit, said inductance element and said capacitors respectively providing the inductance and capacitance primarily determining the resonant frequency of said high-frequency supply means, a loop connected to said supply means and disposed within said applicator for magnetically transferring power to said load circuit, and means for extending and retracting said inductance element for movement of each capacitor plate at the opposite ends thereof independently and by different amounts.

6. A dielectric heating applicator of the reentrant type in which heating energy is supplied from a power tube, comprising a housing, an inductance element within said housing, a pair of serially connected capacitors within said housing and in a series circuit including said inductance element and wall structure of said housing, at least one of said capacitors being comprised of heating electrodes between which dielectric work is to be heated, said inductance element being electrically connected at one end to one of said electrodes, the other of said capacitors being electrically connected to the other end of said inductance element and to the other of said electrodes, and means for deriving a potential from said other of said capacitors for application of excitation to the grid of the oscillator tube, the magnitude of the potential being less than the potential across said capacitor which includes said heating electrode connected to said inductance element.

7. In a dielectric heating system, the combination of an applicator having conductive wall structure, an inductance element disposed within said applicator and in spaced relation to all wall structure thereof, a capacitor at each opposite end of said inductance element electrically interconnecting said inductance element with said wall structure to form a resonant circuit therewith, supply means including a source of high-frequency current for said applicator for heating of a load which at least in part forms the dielectric of at least one of said capacitors, one of said capacitors having a capacitance which is large relative to that of the other of said capacitors, and a grid-driving circuit for said high-frequency supply means connected to the larger of said capacitors.

8. In a dielectric heating system, the combination of a reentrant applicator having conductive wall structure, an inductance element comprising a metallic fin disposed within said applicator and in spaced relation to all wall structure thereof, an elongated capacitor at each opposite end of said inductance element for electrically interconnecting said inductance element with said wall structure to form a resonant load circuit therewith, supply means including a source of high-frequency current for said applicator for heating of a load which at least in part forms the dielectric of at least one of said capacitors, one of said capacitors having a capacitance which is large relative to the other of said capacitors, a grid-driving circuit for said high-frequency supply means connected to the larger of said capacitors, and means for adjusting the capacitance of both of said capacitors.

9. In a dielectric heating system, the combination of an applicator having conductive wall structure, an inductance element disposed within said applicator and in spaced relation to all wall structure thereof, a capacitor plate at each opposite end of said inductance element respectively forming capacitors with said wall structure for electrically connecting said inductance element with said wall structure to form a resonant circuit including said capacitors and said inductance element in series-circuit relation, supply means including a source of high-frequency current of approximately said frequency of said resonant circuit, an output circuit extending between said supply means and said resonant circuit for energizing said applicator for heating of a load which at least in part forms the dielectric of at least one of said capacitors, and at least one access opening in said wall structure for placement of the work to be heated in a position to form said part of said dielectric.

10. In a dielectric heating system, the combination of an applicator having conductive wall structure forming a housing for a heating chamber, a load circuit including an electrically conductive inductance structure disposed within said chamber in spaced relation with all wall structure thereof, a capacitor plate at each opposite end of said inductance element of greater length and breadth than that of said inductance structure, each said plate being conductively connected to said element, said plates being respectively disposed adjacent the portions of said wall structure located nearest said opposite ends of said inductance structure, said wall portions forming respectively the opposing plates of capacitors at said opposite ends of said element, a supply loop within said applicator magnetically coupled to said inductance structure, said load circuit including in series-circuit relation said inductance structure, said capacitors and said wall structure, said wall structure having at least one access opening for disposition of work between opposing plates of one of said capacitors, and high-frequency supply means having an output circuit connected to said coupling loop for supplying said load circuit with current at a frequency substantially corresponding with the resonant frequency of said load circuit as determined by said series inductance structure and said series connected capacitors.

References Cited in the file of this patent

UNITED STATES PATENTS

| | | |
|---|---|---|
| 2,259,690 | Hansen et al. | Oct. 21, 1941 |
| 2,513,334 | Kirkman et al. | July 4, 1950 |